(12) United States Patent
Riwan et al.

(10) Patent No.: US 9,004,202 B2
(45) Date of Patent: Apr. 14, 2015

(54) OMNIDIRECTIONAL WHEEL THAT CAN BE DRIVEN BY A MOTOR AND VEHICLE PROVIDED THEREWITH

(71) Applicant: Commissariat a l'Energie Atomique et aux Energies Alternatives, Paris (FR)

(72) Inventors: Alain Riwan, Chevilly-Larue (FR); Alexandre Verney, Grenoble (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 14/349,915

(22) PCT Filed: Oct. 5, 2012

(86) PCT No.: PCT/EP2012/069701
§ 371 (c)(1),
(2) Date: Apr. 4, 2014

(87) PCT Pub. No.: WO2013/050518
PCT Pub. Date: Apr. 11, 2013

(65) Prior Publication Data
US 2014/0252844 A1    Sep. 11, 2014

(30) Foreign Application Priority Data
Oct. 6, 2011   (FR) .................................... 11 59013

(51) Int. Cl.
*B60B 19/00* (2006.01)
*B60B 19/14* (2006.01)
*B60B 33/00* (2006.01)
*B60B 33/08* (2006.01)

(52) U.S. Cl.
CPC .............. *B60B 19/003* (2013.01); *B60B 19/14* (2013.01); *B60B 33/0042* (2013.01); *B60B 33/08* (2013.01)

(58) Field of Classification Search
CPC .. B60B 19/003; B60B 33/0042; B60B 33/08; B60B 19/14
See application file for complete search history.

(56) References Cited

U.S. PATENT DOCUMENTS

| 5,325,935 A | 7/1994 | Hirooka et al. |
| 6,374,937 B1 | 4/2002 | Galando et al. |
| 6,502,657 B2 * | 1/2003 | Kerrebrock et al. .......... 180/218 |

(Continued)

FOREIGN PATENT DOCUMENTS

| DE | 78488 C | 12/1894 |
| DE | 119513 C | 11/1899 |

(Continued)

OTHER PUBLICATIONS

International Search Report of PCT/EP2012/069701, dated Nov. 23, 2012.

*Primary Examiner* — Kevin Hurley
(74) *Attorney, Agent, or Firm* — Sughrue Mion, PLLC

(57) ABSTRACT

Spherical wheel that can be driven by a motor comprising a first body (1.1) and a second body (1.2) which are substantially hemispherical and are mounted coaxially to one another so as to pivot about a support axle (2), the bodies being separated by an interstice (3) into which there extends a shaft (6), said shaft having an end that is rigidly connected to the support axle and an opposite end that is connected to a drive motor, characterized in that at least one element (7, 17) extending at least one portion of the outer surface of the bodies extends into the interstice.

Vehicle comprising a chassis that is supported by such wheels.

14 Claims, 4 Drawing Sheets

(56) References Cited

U.S. PATENT DOCUMENTS 7,039,980 B2 * 5/2006 Van Der Meyden et al. .... 15/1.7
7,217,170 B2 * 5/2007 Moll et al. .................... 446/164
8,496,077 B2 * 7/2013 Nesnas et al. ................. 180/7.5

FOREIGN PATENT DOCUMENTS

| DE | 3414859 A1 | 11/1984 |
|----|------------|---------|
| NL | 7810429 A | 4/1980 |
| WO | 01-30635 A1 | 5/2001 |

\* cited by examiner

OMNIDIRECTIONAL WHEEL THAT CAN BE DRIVEN BY A MOTOR AND VEHICLE PROVIDED THEREWITH

CROSS REFERENCE TO TELATED APPLICATIONS

This application is a National Stage of International Application No. PCT/EP2012/069701 filed Oct. 5, 2012, claiming priority based on French Patent Application No. 11 59013, Oct. 6, 2011, the contents of all of which are incorporated herein by reference in their entirety.

The present invention relates to an omnidirectional wheel that can be driven by a motor. Omnidirectional wheels are utilized to produce vehicles that are capable of moving, without a prior maneuver, in any arbitrary direction and with any orientation. The vehicle in this case is referred to as being "holonomic". The invention also relates to a vehicle equipped with such wheels.

Traditional wheeled vehicles follow a path that is tangent to the orientation of their steering wheels, the orientation being modified for the purpose of changing direction.

The presence of non-steering wheels and the small amplitude of the orientation of the steering wheels make it impossible to change direction independently of the prior orientation of the vehicle.

A wheeled vehicle of which all the wheels are steering wheels may change direction arbitrarily subject to the condition that its wheels have been previously reoriented into the new direction. Such a vehicle is referred to as "omnidirectional".

A holonomic vehicle must, in order to be able to follow any arbitrary trajectory without a prior maneuver, have three independent degrees of mobility in relation to the plane on which it rests: two translations in directions that are parallel to the plane and one rotation about an axis that is normal to the plane.

Numerous solutions exist for wheels which permit the realization of a holonomic vehicle. These wheels differ in respect of the regularity of their tread, their load-bearing capacity, their capacity to negotiate obstacles and the constancy of the polygon supporting the vehicle that is utilizing them.

A wheel of this kind comprising a rim having a polygonal circumference, mounted on each side of which are rollers in the form of barrels which pivot about an axis that is orthogonal to the axis of the rim, is thus familiar from document U.S. Pat. No. 3,789,947. An interstice that is necessary for the connection of the rollers to the rim is present between two adjacent rollers. These interstices between the rollers create a discontinuity in the tread surface, which, in the course of use, gives rise to vibrations and instability of the position.

By the same principle, there are also wheels of the previous type comprising a rim, on the periphery of which are mounted two sets of rollers mounted so as to pivot about axes extending in two planes that are perpendicular to the axis of rotation of the rim. The rollers of each set extend with respect to the interstice existing between two rollers of the other set in order to ensure continuity of the tread surface. Nevertheless, when passing from one roller to the other, the position of the point of contact varies along the axis of rotation of the rim. This variation causes, on the one hand, variations in the radius of curvature preventing precise odometry and, on the other hand, considerable sensitivity to irregularities in the ground which risk causing the contact of one row of rollers to be lost.

Documents U.S. Pat. No. 3,876,255 and FR-A-2206195 describe a wheel having a rim, on a periphery of which are mounted rollers pivoting about an axis that is inclined in relation to the axis of rotation of the rim. This makes it possible to ensure relative continuity of the tread surface, but it brings about, as previously albeit to a lesser degree, a variation in the position of the point of contact of the wheel on the ground.

Other solutions exist, based on the principle of document U.S. Pat. No. 3,789,947, in which the rollers, having different profiles or in the form of a cup, are partially nested one in the other in order as far as possible to ensure a relative continuity of the tread surface. These solutions are not perfect, however, and, as the case may be, are not adapted to move on an inclined ground, are complex to implement and/or allow discontinuities in the tread surface to persist.

Also familiar are wheels with flexible peripheral rollers having a continuous tread surface, which, while very complicated to implement, offers only a low load-bearing capacity.

The major disadvantage associated with these solutions is still that they possess only a low capacity to negotiate an obstacle in the direction of the axis of rotation of the rim because of the small radius of the rollers.

In order to overcome this disadvantage, consideration has been given to resorting to a spherical wheel that can be driven by a motor comprising a first body and a second body which are substantially hemispherical and are mounted coaxially to one another so as to pivot about a support axle. The bodies are separated by an interstice, into which there extends a shaft having one end that is rigidly connected to the support axle and an opposite end that is connected to a drive motor. This wheel exhibits a capacity for free displacement parallel to the drive shaft and a capacity for motorized displacement perpendicular to the drive shaft. This wheel further possesses interesting negotiating capacities in all directions, because its radius of curvature remains identical in all directions. By contrast, this wheel has a tread surface of which the discontinuity reduces with the width of the interstice, whereas its load-bearing capacity increases with the diameter of the shaft and, as a result, also with the width of the interstice. It is therefore impossible for such a wheel to exhibit a substantially continuous tread surface and a high load-bearing capacity.

The object of the invention is thus to propose a wheel permitting in particular the realization of a holonomic vehicle with the ability to negotiate obstacles in all directions without any reduction in its load-bearing capacity.

For this purpose, proposed according to the invention is a spherical wheel that can be driven by a motor comprising a first body and a second body which are substantially hemispherical and are mounted coaxially to one another so as to pivot about a support axle, said bodies being separated by an interstice into which there extends a shaft having an end that is rigidly connected to the support axle and an opposite end projecting from the bodies. At least one element extending at least one portion of the outer surface of the bodies extends into the interstice.

The wheel of the invention is thus an omnidirectional spherical wheel, of which the interstice may be relatively large at the level of the motor shaft, in order to permit a high load-bearing capacity, and may be reduced or zero at the level of contact with the ground in order to ensure good continuity of movement.

According to a first embodiment of the invention, the extending element is a petal that is articulated on a circular edge of the first body in order to be mobile between a flush position in which it extends towards the second body in the interstice and a retracted position in which it moves away from the interstice.

In a first version, the wheel comprises extending elements in the form of a petal extending from each of the bodies.

In a second version, the petal in the flush position is supported on the circular edge of the second body.

Preferably, in this embodiment, the shaft has its end portion that is connected to the shaft support shaped to bring the extending element from its flush position to its retracted position and the extending element is connected, to the body on which it is articulated, by an elastic element for returning it into the flush position.

Thus, the displacement of the extending element into its retracted position is brought about by its contact with the casing of the motor shaft which acts as a cam. It is not necessary, therefore, to provide dedicated control of the continuity element.

Advantageously, the petal has a substantially trapezoidal form having a large base and the petal is articulated via its large base to the body.

This permits the ground clearance of the extending element in the retracted position to be increased and accordingly the capacity to negotiate obstacles.

According to a second embodiment, the extending element is a roller that is mounted in the interstice so as to pivot about an axis parallel to the support axle having an outer surface that is flush with the outer surface of the bodies.

According to one particular characteristic feature, the wheel comprises rollers that are mounted in a housing arranged in each body at each end of the support axle in such a way that each of said rollers has a portion of its outer surface that is flush with the outer surface of the body through an opening in the housing, the rollers being mounted so as to pivot about an axis of rotation that is orthogonal to the support axle and to the shaft. Preferably, the outer surface of these rollers substantially has a form of revolution about the axis of rotation of the rollers and includes a central annular rolling portion that is flush with the outer surface of the body via the opening in the housing and two lateral annular portions which extend at least partially beneath a lip delineating the opening in the housing.

Advantageously, the lip is capable of being deformed elastically and the lateral annular portions form a supporting surface for the lip in its deformed state, and the lateral annular portions preferably include a coating with a low coefficient of friction.

The object of the invention is likewise a vehicle comprising a chassis that is supported by wheels of the same type as that of the invention.

Other characterizing features and advantages of the invention will be appreciated from reading the following description of particular, non-limiting embodiments of the invention.

Reference is made to the accompanying drawings, in which.

Figure 1:
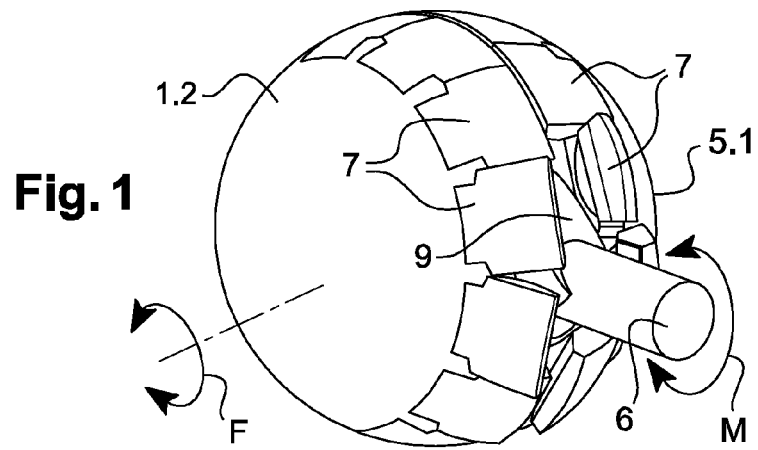
FIG. 1 is a perspective view of a wheel according to a first version of a first embodiment.
Figure 2:
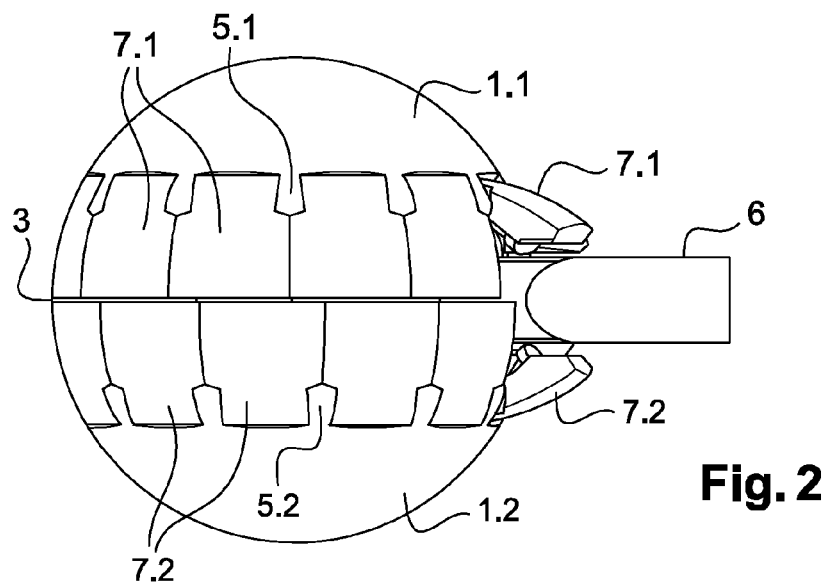
FIG. 2 is a top view of this wheel.
Figure 3:
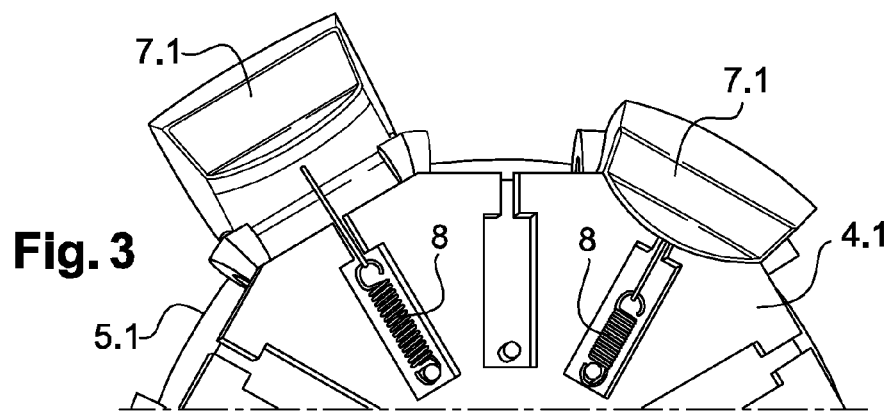
FIG. 3 is partially sectioned view of this wheel according to plane III in FIG. 2.
Figure 4:
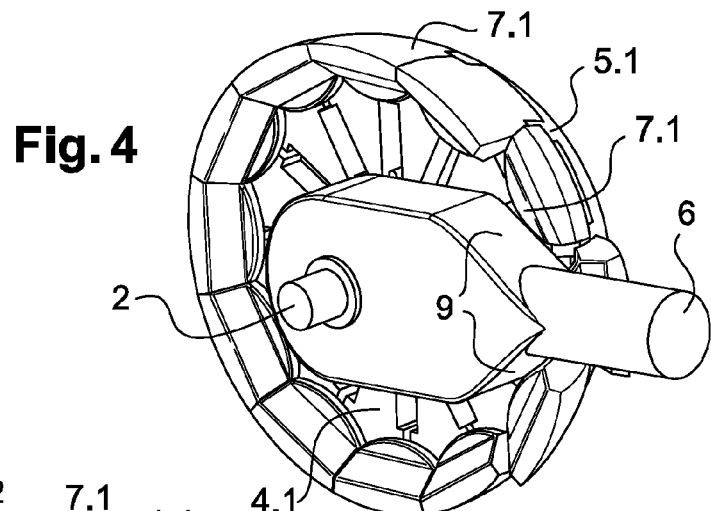
FIG. 4 is a perspective view of this wheel in cross section according to plane III.
Figure 5:
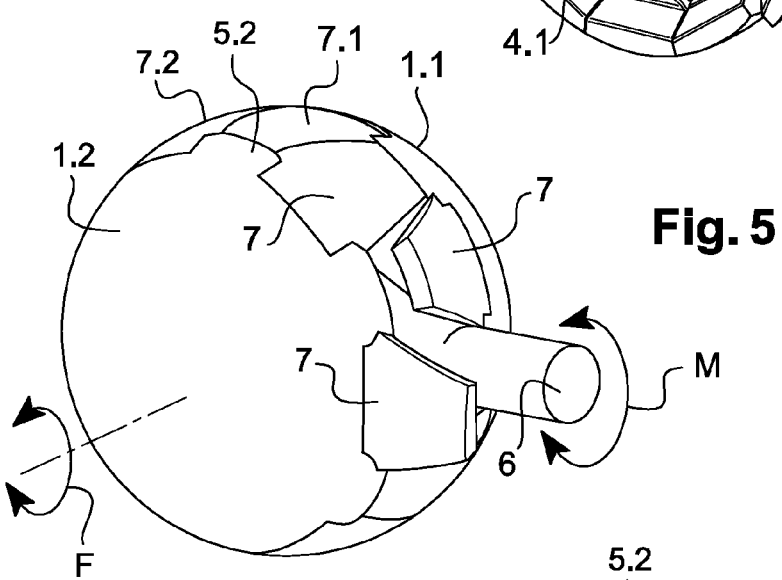
FIG. 5 is a perspective view of a wheel according to a second version of the first embodiment.
Figure 6:
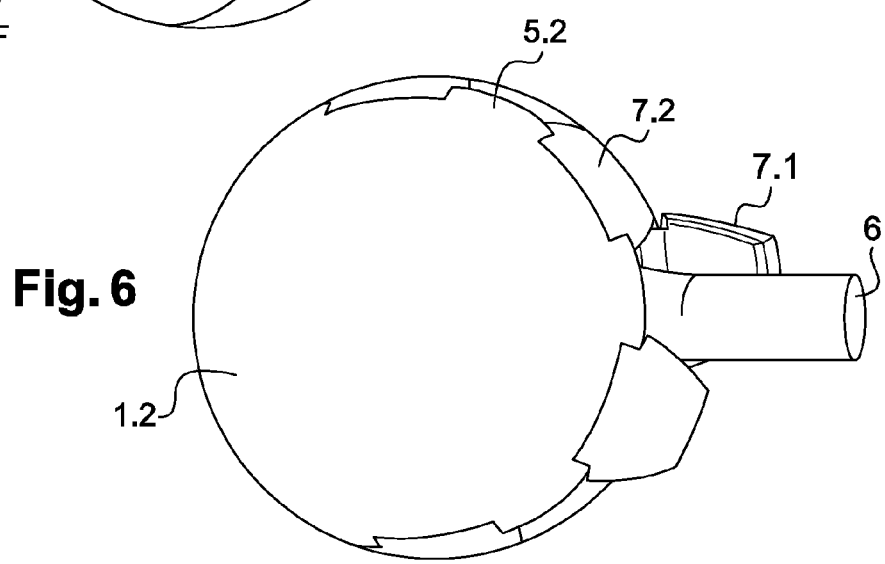
FIG. 6 is a side view of this wheel.

With reference to the figures, the spherical wheel that can be driven by a motor according to the invention comprises a first body 1.1 and an identical second body 1.2 which are substantially hemispherical. The bodies 1.1, 1.2 are mounted coaxially to one another so as to pivot freely about a support axle 2 by means of at least one bearing such as a needle roller bearing or the like. The bodies 1.1, 1.2 are separated from one another by an interstice 3 that is delineated laterally by walls 4.1, 4.2 that are parallel with one another, each belonging to one of the bodies 1.1, 1.2. The walls 4.1, 4.2 are delineated by a circular edge 5.1, 5.2. Extending into the interstice 3 is a shaft 6 having one end that is rigidly connected to the support axle 2 and an opposite end which extends in projection from the bodies 1.1 and 1.2 and which is connected to a drive motor 30 (visible in FIGS. 8 and 9).

The wheel is thus capable of motorized displacement (rotation of the shaft 6 symbolized by the arrow M) and of free displacement (rotation of the bodies 1.1, 1.2 about the support axle 2 symbolized by the arrow F).

A roller 10 (illustrated only in FIG. 7, but present in all the embodiments) is mounted at each end of the support axle 2 in order to be flush with the outer surface of the bodies 1.1, 1.2. The rollers 10 have the form of a barrel and are mounted so as to pivot about an axis that is orthogonal to the support axle 2 and to the shaft 6. Each roller 10, when it is in contact with the ground, thus permits the free displacement of the wheel in a direction parallel to the shaft 6.

At least one element extending at least one portion of the outer surface of the bodies 1.1, 1.2 extends into the interstice 3.

With reference to FIGS. 1 to 6, the wheel according to the first embodiment comprises a plurality of extending elements, each formed by a petal that is articulated on the circular edge 5.1, 5.2 of one of the bodies 1.1, 1.2 between a flush position, in which it extends into the interstice 3 towards the second body 1.2, 1.1, and a retracted position, in which it moves away from the interstice 3 by adopting a position projecting from the outer surface of the bodies 1.1, 1.2. Each petal 7 has a substantially trapezoidal form having a large base, and the petal 7 is articulated via its large base to the body. This trapezoidal form permits a relatively large ground clearance of the petal in the retracted position (see FIG. 6).

In the first version of the first embodiment (FIGS. 1 to 4), petals 7.1, 7.2 extend from each of the bodies 1.1, 1.2. The petals 7.1, 7.2 in this case are provided around the totality of the circumference of the circular edge 5.1, 5.2. Each petal 7.1, 7.2 is connected to the body 1.1, 1.2 to which it is articulated by an elastic element for returning the petal 7.1, 7.2 into its flush position. The return elements in this case are helicoidal tension springs 8, which are received in housings arranged in the walls 4.1, 4.2 in such a way as to extend radially in relation to the circular edge 5.1, 5.2.

The shaft 6 has its end portion connected to the support axle 2 which is shaped to bring the petals 7 from their flush position to their retracted position. The shaft 6 thus comprises two lateral surfaces 9 extending transversely to the interstice 3, which surfaces are configured in order to raise the petals 7 in the manner of a cam when they come into contact the latter. The petals 7 are returned towards their flush position as they move out of contact with the lateral surfaces 9.

In the second version of the first embodiment (FIGS. 5 and 6), the petals 7.1 are offset in relation to the petals 7.2 in such a way that a free portion of the circular edge 5.2, 5.1 extends with respect to each petal 7.1, 7.2. The petals 7.1, 7.2 possess a length such that, in their flush position, the petals 7.1, 7.2 are supported on the free portion of the circular edge 5.2, 5.1.

In this version, the two hemispheres are connected together in order to synchronize their rotation in such a way that the petals are supported at all times on the housing which faces them.

The second version is otherwise identical with the first version.

Figure 7:
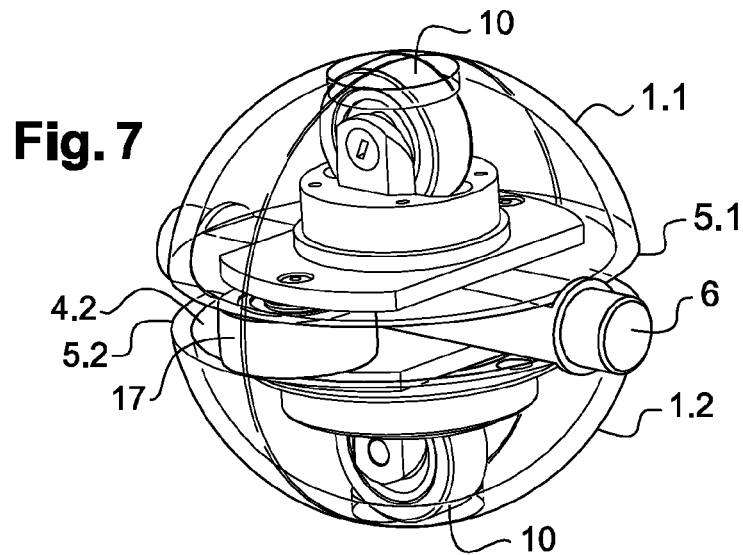
FIG. 7 is a perspective view and a see-through view of a wheel according to a second embodiment.

In the second embodiment, illustrated in FIG. 7, the extending elements are two in number and are each formed by a roller 17 mounted in the interstice 3 so as to pivot about an axis that is parallel to the support axle 2. Each roller 17 has an outer surface in the form of a barrel which is flush with the outer surface of the bodies 1.1, 1.2.

More specifically, the rollers 17 are mounted in a jaw which extends into the interstice and which is rotationally coupled with the support axle 2 and therefore also with the shaft 6.

Figure 10:
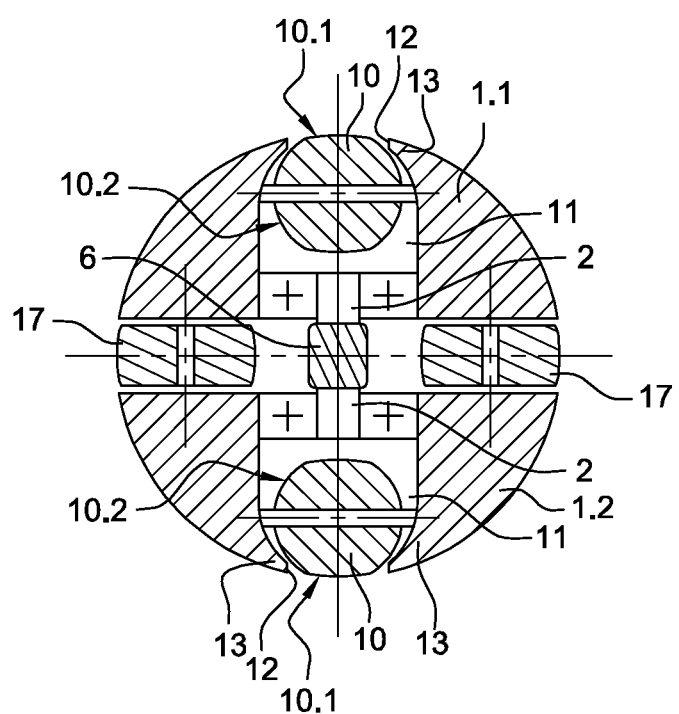
FIG. 10 is a schematic view in transverse section of a wheel according to a variant of the second embodiment.

As a variant, as illustrated in FIG. 10, the wheel comprises two rollers 10, each mounted in a housing arranged in each body 1.1, 1.2 at each end of the support axle 2 in such a way that each of these rollers 10 has a portion of the outer surface that is flush with the outer surface of the body through an opening 12 in the housing 11. The rollers 10 are mounted so as to pivot about an axis of rotation that is orthogonal to the support axle 2 and to the shaft 6.

The outer surface of each roller 10 substantially has a form of revolution about the axis of rotation of said roller 10 and includes a central annular rolling portion 10.1 that is flush with the outer surface of the body 1.1, 1.2 via the opening 12 in the housing 11, and two lateral annular portions 10.2 which extend at least partially beneath a lip 13 delineating the opening 12 in the housing 11.

The central annular rolling portion 10.1 in this case has the form of a barrel, and the lateral annular portions 10.2 in this case have the form of a spherical cap.

The lip 13 may be deformed elastically under a very high load supported by the wheel: the lateral annular portions 10.2 are arranged in order to form a supporting surface for the lip 13 in its deformed state. The lateral annular portions 10.2 advantageously include a coating with a low coefficient of friction in order to facilitate sliding of the lip 13 on the lateral annular portions 10.2.

The space between the edge of the lip 13 and the central annular rolling portion 10.1 is reduced, which permits the resistance to rolling and the noise to be reduced.

The support obtained on the lips by the lateral annular portions makes it possible to have relatively thin lips without adversely affecting the load-bearing capacities of the wheel.

The object of the invention is likewise a vehicle comprising a chassis that is supported by wheels according to the invention.

Figure 8:
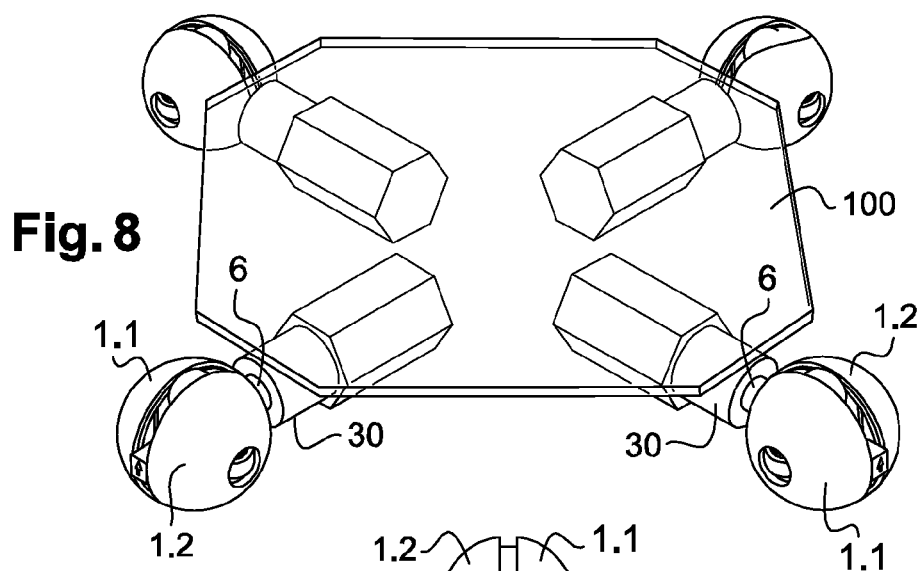
FIG. 8 is a perspective view of a vehicle equipped with wheels according to the second embodiment.

With reference to FIG. 8, the chassis 100 of the vehicle substantially has the form of a triangle, mounted at each apex of which is a wheel according to the second embodiment (the apexes of the triangle in this case are truncated in order to augment the compactness of the vehicle).

In this case, the stator of each drive motor 30 is fixed to the chassis 100 via a device, not illustrated here, for orienting the wheels in relation to the chassis. More precisely, the stators in this case are mounted on turntables which are themselves mounted in a pivoting fashion on the chassis about an axis that is perpendicular to the plane of the chassis and which are each associated with a motor permitting the wheels to be oriented in relation to the chassis.

The fixing of the wheels to the chassis is known in its own right, as is the control of the said wheels.

Figure 9:
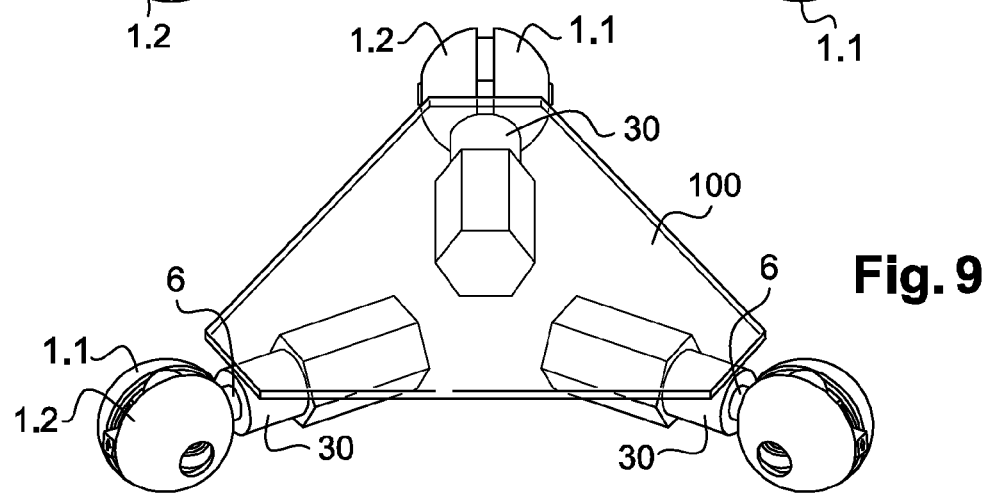
FIG. 9 is a view similar to FIG. 8 of a variant of this vehicle.

As a variant, as illustrated in FIG. 9, the chassis 100 of the vehicle substantially has the form of a square, mounted at each apex of which is a wheel according to the second embodiment (the apexes of the square in this case are truncated in order to augment the compactness of the vehicle).

The invention is not restricted to the described embodiments, of course, but includes any variant falling within the scope of the invention as defined by the claims.

In particular, in the first embodiment, it is possible to envisage an actuator for the purpose of displacing the petals between their flush position and their retracted position in such a way as to cause the progressive phasing-out of the petals ahead of the drive shaft as the wheel rotates and folding the petals down again after the passage of the drive shaft.

The vehicle may have a structure other than that described and may possess a chassis of circular form, for example.

The invention claimed is:

1. A spherical wheel comprising a first body (1.1) and a second body (1.2) which are substantially hemispherical and are mounted coaxially to one another so as to pivot about a support axle (2), said bodies being separated by an interstice (3) into which there extends a shaft (6) having an end that is rigidly connected to the support axle and an end projecting from the bodies, characterized in that at least one element (7, 17) extending at least one portion of the outer surface of the bodies extends into the interstice.

2. The wheel as claimed in claim 1, in which the shaft (6) is connected to a driving means.

3. The wheel as claimed in claim 1, in which the extending element is a petal (7) that is articulated on a circular edge (5.1) of the first body (1.1) in order to be mobile between a flush position in which it extends towards the second body (1.2) in the interstice (3) and a retracted position in which it moves away from the interstice.

4. The wheel as claimed in claim 3, comprising extending elements in the form of a petal (7) extending from each of the bodies (1.1, 1.2).

5. The wheel as claimed in claim 3, in which the petal (7) in the flush position is supported on the circular edge (5.2) of the second body (1.2).

6. The wheel as claimed in claim 3, in which the shaft (6) has its end portion that is connected to the support axle (2) shaped to bring the extending element (7) from its flush position to its retracted position and the extending element (7) is connected, to the body on which it is articulated, by an elastic element (8) for returning it into the flush position.

7. The wheel as claimed in claim 3, in which the petal (7) has a substantially trapezoidal form having a large base and the petal is articulated via its large base to the body (1).

8. The wheel as claimed in claim 1, in which the extending element is a roller (17) that is mounted in the interstice (3) so as to pivot about an axis parallel to the support axle (2) having an outer surface that is flush with the outer surface of the bodies (1).

9. The wheel as claimed in claim 8, in which the roller (17) is mounted in a jaw which extends into the interstice (3) and which is rotationally coupled with the shaft (6).

10. The wheel as claimed in claim 1, comprising rollers (10) that are mounted in a housing (11) arranged in each body at each end of the support axle (2) in such a way that each of said rollers has a portion of the outer surface that is flush with the outer surface of the body through an opening (12) in the housing, the rollers being mounted so as to pivot about an axis of rotation that is orthogonal to the support axle (2) and to the shaft (6).

11. The wheel as claimed in claim 10, in which the outer surface of each roller (10) substantially has a form of revolution about the axis of rotation of said roller and includes a central annular rolling portion (10.1) that is flush with the outer surface of the body via the opening in the housing and two lateral annular portions (10.2) which extend at least partially beneath a lip (13) delineating the opening (12) in the housing (11).

12. The wheel as claimed in claim 11, in which the lip (13) is capable of being deformed elastically and the lateral annular portions (10.2) form a supporting surface for the lip in its deformed state.

13. The wheel as claimed in claim 12, in which the lateral annular portions (10.2) include a coating with a low coefficient of friction.

14. Vehicle comprising a chassis that is supported by wheels in accordance with claim 1.

* * * * *